(12) United States Patent
Desai et al.

(10) Patent No.: US 8,060,703 B1
(45) Date of Patent: Nov. 15, 2011

(54) TECHNIQUES FOR ALLOCATING/REDUCING STORAGE REQUIRED FOR ONE OR MORE VIRTUAL MACHINES

(75) Inventors: Komal Desai, Fremont, CA (US); Jonathan Purcell, Hertfordshire (GB); Bruce Montague, Santa Cruz, CA (US); Viswesvaran Janakiraman, San Jose, CA (US); Douglas Fallstrom, Menlo Park, CA (US); Rajeev Bharadhwaj, Saratoga, CA (US)

(73) Assignee: Symantec Corporation, Mountain View, CA (US)

( * ) Notice: Subject to any disclaimer, the term of this patent is extended or adjusted under 35 U.S.C. 154(b) by 806 days.

(21) Appl. No.: 11/694,727

(22) Filed: Mar. 30, 2007

(51) Int. Cl.
*G06F 12/00* (2006.01)
(52) U.S. Cl. .................. 711/147; 711/154; 711/E12.07
(58) Field of Classification Search .................. None
See application file for complete search history.

(56) References Cited

U.S. PATENT DOCUMENTS

| | | | |
|---|---|---|---|
| 6,363,455 B2 * | 3/2002 | Kusakabe et al. | 711/103 |
| 6,487,645 B1 * | 11/2002 | Clark et al. | 711/162 |
| 7,158,972 B2 * | 1/2007 | Marsland | 1/1 |
| 7,246,200 B1 * | 7/2007 | van Rietschote et al. | 711/114 |
| 7,577,806 B2 * | 8/2009 | Rowan et al. | 711/162 |

* cited by examiner

*Primary Examiner* — Kevin Ellis
*Assistant Examiner* — Hamdy Ahmed
(74) *Attorney, Agent, or Firm* — Wilmer Cutler Pickering Hale and Dorr LLP (57) ABSTRACT

Techniques for allocating/reducing storage required for one or more virtual machines are disclosed. In one particular exemplary embodiment, the techniques may be realized as a method for allocating storage for one or more virtual machines. The method may comprise providing one or more virtual machines. The method may also comprise creating one or more master images containing one or more commonly used blocks. The method may also comprise creating one or more Copy on Write volumes, where each Copy on Write volume may be associated with at least one of the one or more virtual machines and at least one of the one or more master images, and wherein updated blocks may be stored in at least one of the one or more Copy on Write volumes, thereby reducing storage required for one or more virtual machines.

16 Claims, 7 Drawing Sheets

Without optimization

| | | | | | | | | | | | | | | | |
|---|---|---|---|---|---|---|---|---|---|---|---|---|---|---|---|
| COW_VM1 | | | | | | | | | 3.1 | 3.2 | 3.3 | 3.4 | | | |
| | | | | | | | | | | File-3b | | | | | |
| COW_VM2 | | | | | | | | 2.1 | 2.2 | 3.1 | 3.2 | 3.3 | 3.4 | | |
| | | | | | | | | File-2 | | | File-3b | | | | |
| Master Image | 1.1 | 1.2 | 1.3 | | 3.1 | 3.2 | 3.3 | | | | | | | | |
| | File-1 | | | | File-3a | | | | | | | | | | |

TECHNIQUES FOR ALLOCATING/REDUCING STORAGE REQUIRED FOR ONE OR MORE VIRTUAL MACHINES

FIELD OF THE DISCLOSURE

The present disclosure relates generally to storage optimization and, more particularly, to techniques for allocating/reducing storage required for one or more virtual machines.

BACKGROUND OF THE DISCLOSURE

In a traditional server environment, a physical server may contain a local storage device. The local storage device may be a hard disk drive. The local storage device may store a boot image for the physical server. The physical server may read data from the boot image stored on the local storage device and may load an operating system and associated programs and utilities from the local storage device.

In an environment which includes server virtualization, multiple virtual machines may operate within a single physical machine. The virtual machines may also migrate between physical machines. Shared storage is desirable for server virtualization environments because of the potential of virtual machine migration. However, hosting a separate boot image for each virtual machine instance may create an enormous demand for storage within the shared storage system. For example, a system of thirty physical servers, each hosting twenty virtual machines, must have storage on the shared storage system for six hundred boot images. This requirement increases the cost of creating and maintaining a virtual machine environment.

The virtual machines, however, may be redundant copies of one another used as overflow or fail-over backups, and thus may be instantiated using nearly identical boot images. Other virtual machines may share substantially similar boot images. In large part, identical or substantially similar boot images may ultimately require that the shared storage system separately store hundreds or thousands of copies of identical files or blocks. This is an inefficient allocation of finite storage within the shared storage system. The addition of servers or virtual machines may require that the storage within the shared storage system be significantly increased, adding additional financial requirements to a planned upgrade.

In view of the foregoing, it would be desirable to provide techniques for shared storage and storage optimization which overcomes the above-described inadequacies and shortcomings.

SUMMARY OF THE DISCLOSURE

Techniques for allocating/reducing storage required for one or more virtual machines are disclosed. In one particular exemplary embodiment, the techniques may be realized as a method for allocating storage for one or more virtual machines. The method may comprise providing one or more virtual machines. The method may also comprise creating one or more master images containing one or more commonly used blocks. The method may also comprise creating one or more Copy on Write volumes, where each Copy on Write volume may be associated with at least one of the one or more virtual machines and at least one of the one or more master images, and wherein updated blocks may be stored in at least one of the one or more Copy on Write volumes, thereby reducing storage required for one or more virtual machines.

In accordance with other aspects of this particular exemplary embodiment, the one or more master images may be stored on shared storage.

In accordance with further aspects of this particular exemplary embodiment, the one or more Copy on Write volumes may be stored on shared storage.

In accordance with additional aspects of this particular exemplary embodiment, a network in communication with the one or more virtual machines and a network file system in communication with the network may be provided.

In accordance with additional aspects of this particular exemplary embodiment, an appliance may be in communication with the network, where the appliance may contain the one or more master images and the one or more Copy on Write volumes.

In accordance with additional aspects of this particular exemplary embodiment, the updated blocks may be one or more new blocks.

In accordance with additional aspects of this particular exemplary embodiment, the updated blocks may be one or more changed blocks from one or more of the commonly used blocks on the one or more master images.

In accordance with additional aspects of this particular exemplary embodiment, there may be at least one signal embodied in at least one carrier wave for transmitting a computer program of instructions configured to be readable by at least one processor for instructing the at least one processor to execute a computer process for performing the method.

In accordance with additional aspects of this particular exemplary embodiment, there may be at least one processor readable carrier for storing a computer program of instructions configured to be readable by at least one processor for instructing the at least one processor to execute a computer process for performing the method.

In another particular exemplary embodiment, the techniques may be realized as a method for allocating storage for one or more virtual machines. The method may comprise providing one or more virtual machines. The method may also comprise providing one or more master images containing one or more commonly used clusters. The method may also comprise providing one or more Copy on Write volumes, where each Copy on Write volume may be associated with at least one of the one or more virtual machines and at least one of the one or more master images. The method may also comprise identifying one or more clusters contained within at least one of the one or more Copy on Write volumes. The method may also comprise copying the one or more identified clusters from the at least one Copy on Write volume to the one or more master images so as to reduce storage.

In accordance with other aspects of this particular exemplary embodiment, the method may further comprise the step of freeing the one or more identified clusters from the at least one Copy on Write volume.

In accordance with further aspects of this particular exemplary embodiment, one or more identified clusters may be substantially similar.

In another particular exemplary embodiment, the techniques may be realized as a method for allocating storage for one or more virtual machines. The system may comprise a means for providing one or more virtual machines. The system may further comprise a means for creating one or more master images containing one or more commonly used blocks. The system may further comprise a means for creating one or more Copy on Write volumes, with the Copy on Write volume associated with at least one of the one or more virtual machines and at least one of the one or more master images, wherein updated blocks may be stored in at least one of the one or more Copy on Write volumes.

In accordance with other aspects of this particular exemplary embodiment, the one or more master images may be stored on a storage area network.

In accordance with further aspects of this particular exemplary embodiment, one or more Copy on Write volumes may be stored on a storage area network.

In accordance with further aspects of this particular exemplary embodiment, the system may further comprise a network in communication with the one or more virtual machines and an appliance in communication with the network.

In accordance with further aspects of this particular exemplary embodiment, the system may further comprise a storage area network in communication with the network, the storage area network containing the one or more master images and the one or more Copy on Write volumes.

In accordance with further aspects of this particular exemplary embodiment, the updated blocks may be one or more new blocks.

In accordance with further aspects of this particular exemplary embodiment, the updated blocks may be one or more changed blocks from one or more of the commonly used blocks on the one or more master images.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
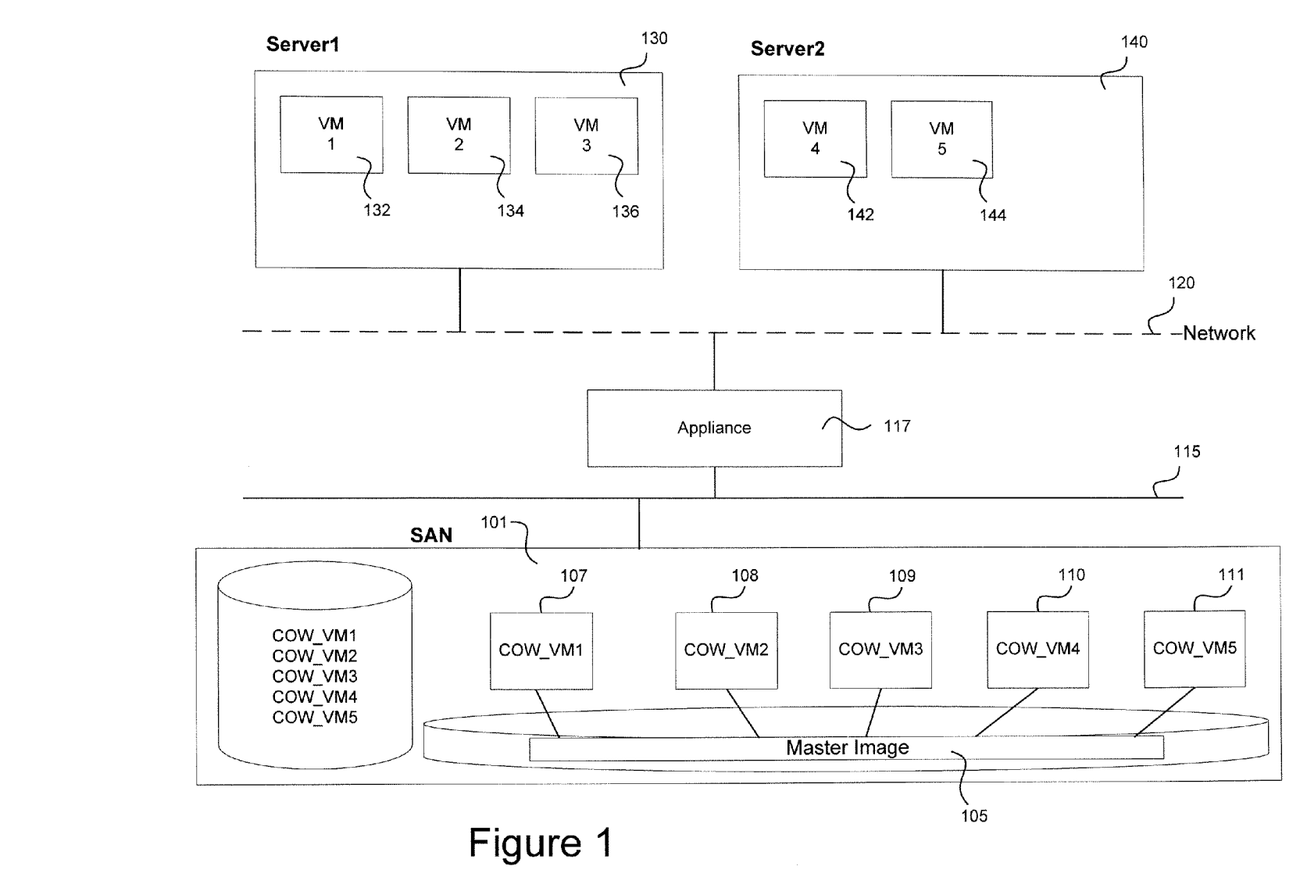
FIG. 1 shows a system level block diagram illustrating a network in accordance with an embodiment of the present disclosure.

Referring to FIG. 1, there is shown an exemplary network diagram in accordance with an embodiment of the present disclosure.

Servers 130 and 140 are shown in the exemplary network depicted in FIG. 1. Servers 130 and 140 may be physical devices commonly known in the art. A server 130 and 140 may receive data from one or more inputs, produce data through one or more outputs, have one or more persistent storage devices for storing and retrieving data, and be in communication with one or more networks 120. Servers 130 and 140 may operate using an operating system, and may load the operating system into memory from local persistent storage, for example a hard drive, or may load the operating system into memory from shared persistent storage across a network 120.

Within a server, one or more virtual machines 132, 134, 136, 142, and 144 may be instantiated. For example, within Server1 130, VM1 132, VM2 134, and VM3 136 may be instantiated. A server may include any number of virtual machines. A virtual machine may appear to be a physical server, but instead may be instantiated on a physical server. A virtual machine may appear to receive data from one or more inputs, produce data through one or more outputs, have addressable memory and persistent storage for storing and retrieving data, and be in communication with one or more networks 120.

Virtual machines may migrate between servers. For example, VM1 132, shown hosted on Server1 130, may move to Server2 140. Migration may help to distribute processor or memory or persistent storage requirements between servers. Virtual machines may also migrate between servers to diversify operations. For example, if one physical server were to fail, at least one virtual machine hosted on another server may be available to continue processing tasks previously processed on the failed server.

Each network 120 may include, but is not limited to, for example, a wide area network (WAN), a local area network (LAN), a global network such as the Internet, a telephone network such as a public switch telephone network, a wireless communication network, a cellular network, an intranet, or the like, or any combination thereof. Also, each network 120 may be used so that components of the present disclosure may be in communication with one another. In exemplary embodiments of the disclosure, a network 120 may include one or any number of the exemplary types of networks mentioned above operating as a stand-alone network or in cooperation with each other. Use of the term network herein is not intended to limit the network to a single network.

A storage area network 101 may be a server or a group of servers that control one or more persistent storage devices. Alternatively, the storage area network 101 may be controlled by a dedicated controller. The persistent storage devices may include, for example, hard disk drives, tape drives, random access memory, read-only memory, or any other kind of device to store and recall information as is known in the art. The storage area network 101 may be operably connected to the one or more networks 120, or may be in communication with an appliance 117 to receive and transmit data. The storage area network 101 may be operable to receive requests from the one or more networks 120, and to transmit data across the one or more networks 120, or the storage area network 101 may be operable to receive requests from the appliance 117 across a dedicated link 115, and to transmit data to the appliance 117 across the dedicated link 115.

A boot, or master, image 105 may be a collection of persistent clusters. The master image 105 may be a contiguous set of blocks as viewed by the appliance 117. The master image 105 may be read by a virtual machine in order to begin operation. For example, the master image 105 may include files that allow a virtual machine to receive, process, and display input and output communication. The master image 105 may also include files that may not be required for proper operation of a virtual machine, but may be desirable for a virtual machine to access if useful. For example, the master image 105 may include a file or files that allow a virtual machine to operate as a web server, or a file server, or may include utility files that allow a virtual machine to perform one-time or repeating tasks.

The master image 105 may be static and set so that the file or files contained within the master image 105 may be read, but not modified, and no new files may be created. Alternatively, the master image 105 may be partially dynamic, so that the file or files in the master image 105 may be read, but only limited block modifications are made to the physical storage of the master image 105 and no master filesystem metadata changes are made. Only one master image 105 may be necessary to operate multiple virtual machines, or more than one master image 105 may be used with more than one virtual machine.

One or more Copy on Write areas 107-111 ("COW volumes") may be created and managed by the appliance 117 using physical storage located in the storage area network 101. The COW volumes 107-111 may be one or more blocks located within persistent storage. Typically, one COW volume may be associated with each virtual machine instantiation, but more than one COW volume may be associated with a single virtual machine, or a single COW volume may be associated with one or more virtual machines. For example, COW_VM1 107 may be associated with VM1 132, COW_VM2 108 may be associated with VM2 134, COW_VM3 109 may be associated with VM3 136, COW_VM4 110 may be associated with VM4 142, and COW_VM5 111 may be associated with VM5 144. Each COW volume may also be associated with a master image 105. The COW volumes 107-111 may be dynamic, so that blocks may be created within each COW volume and modified or freed after creation.

The appliance 117 may contain one or more servers. The appliance 117 may be in communication with the networks 120, so that the appliance 117 may receive signals from the one or more networks 120 and transmit signals to the one or more networks 120. The appliance 117 may also be in communication with the storage area network 101. The communication between the appliance 117 and the storage area network 101 may occur over a network, either the one or more networks 120 or a different network or networks, or the appliance 117 and the storage area network 101 may be connected via the dedicated link 115 between the appliance 117 and the storage area network 101. The appliance 117 may be operable to manipulate files on the storage area network 101 by communicating read and write requests, or other file management requests, to the storage area network 101.

The appliance 117 may be operable to associate a COW volume for a particular virtual machine and the associated master image 105 into a single addressable volume. For example, a virtual machine may request blocks representing boot files from the appliance 117, and the appliance 117 may associate a COW volume for the virtual machine and the associated master image 105 and may represent to the virtual machine that the COW volume and the associated master image 105 comprise a single volume. The virtual machine may then address files or blocks located either on the COW volume for the virtual machine or the associated master image 105 as though they were within the same volume. The virtual machine may be able to address files, and the appliance may view the master image 105 and the COW volumes as blocks or clusters.

In an alternate embodiment, the appliance 117 and the storage area network 101 may be contained within one or more servers. For example, the appliance 117 may be a process running on a server, and the storage area network 101 may be a separate process running on a server, so that the appliance 117 and storage area network 101 may be in communication while residing in the same server or group of servers.

The storage area network 101 and/or appliance 117 may be, for example, a Network File System-based ("NFS") or Internet Small Computer System Interface ("iSCSI") based. A NFS-based system may use a VERITAS VxFS filesystem to create one or more master images 105, and VxFS file-system checkpoints may be used to create the COW volumes 107-111. An iSCSI based system may use a VERITAS Volume Manager ("VxVM") volume to create one or more master images 105 and space-optimized snapshots to create the COW volumes 107-111.

Figure 2:
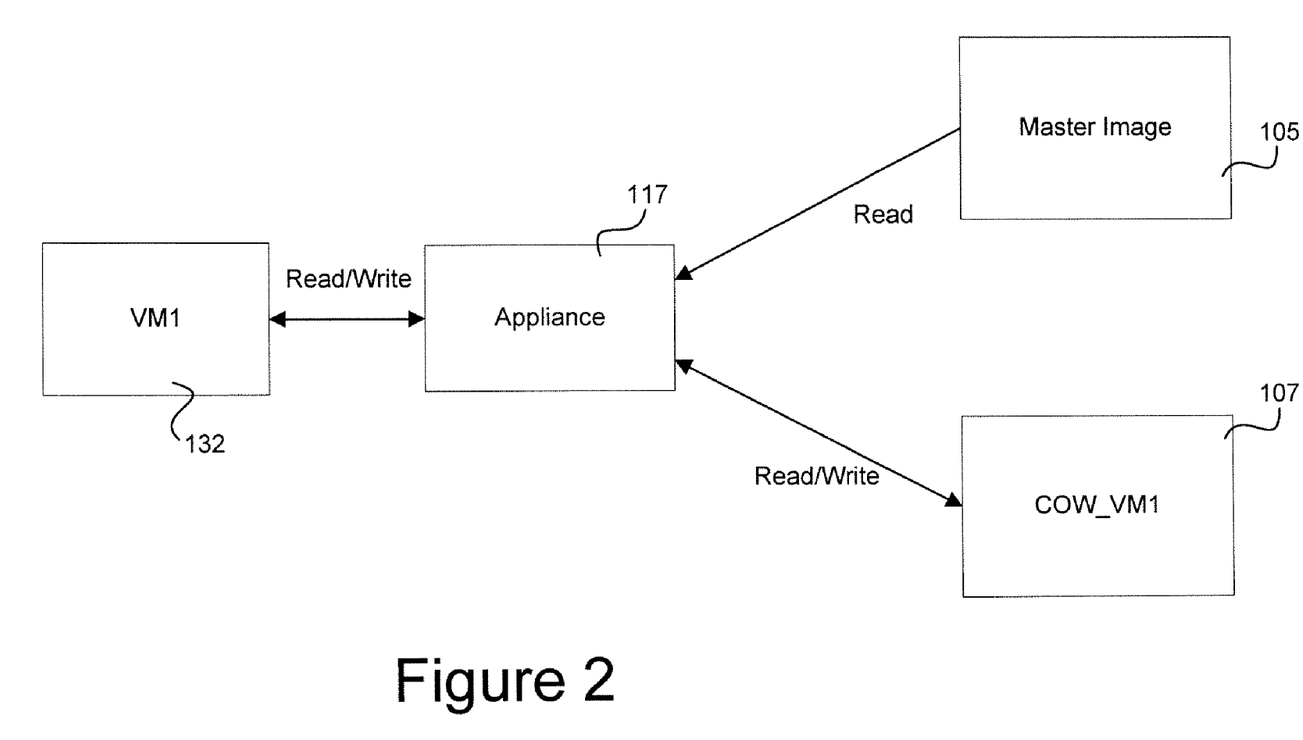
FIG. 2 shows a system level block diagram illustrating data between an exemplary virtual machine and an appliance in accordance with an embodiment of the present disclosure.

Turning now to FIG. 2, a flow of data is shown according to an exemplary embodiment of the disclosure. A virtual machine, named "VM1" for purposes of explanation, is shown. VM1 132 may be operable to request files from the appliance 117. The appliance 117 is in communication with the COW volume 107 associated with VM1 132 ("COW_VM1"), and is in communication with the master image 105. In one embodiment, the appliance 117 may view the one or more files contained within the master image 105, but may not be able to modify the one or more files contained within the master image 105, add files to the one or more files contained within the master image 105, or delete files contained within the master image 105. That is, the appliance 117 may read files from the master image 105, but may not have access to write files to the master image 105. The appliance 117 may view, modify, add to, or delete the files located within COW_VM1 107. The appliance 117 thus may have access to read and write files from/to COW_VM1 107.

VM1 132 may have access to the master image 105 and COW_VM1 107 through the appliance 117, but according to one embodiment of the present disclosure may not be able to address the master image 105 and COW_VM1 107 separately. Instead, the appliance 117 may associate COW_VM1 107 with the master image 105 and allow VM1 132 access to COW_VM1 107 and the associated master image 105 as if the files contained within COW_VM1 107 and the master image 105 were combined into a single volume.

Figure 3A:
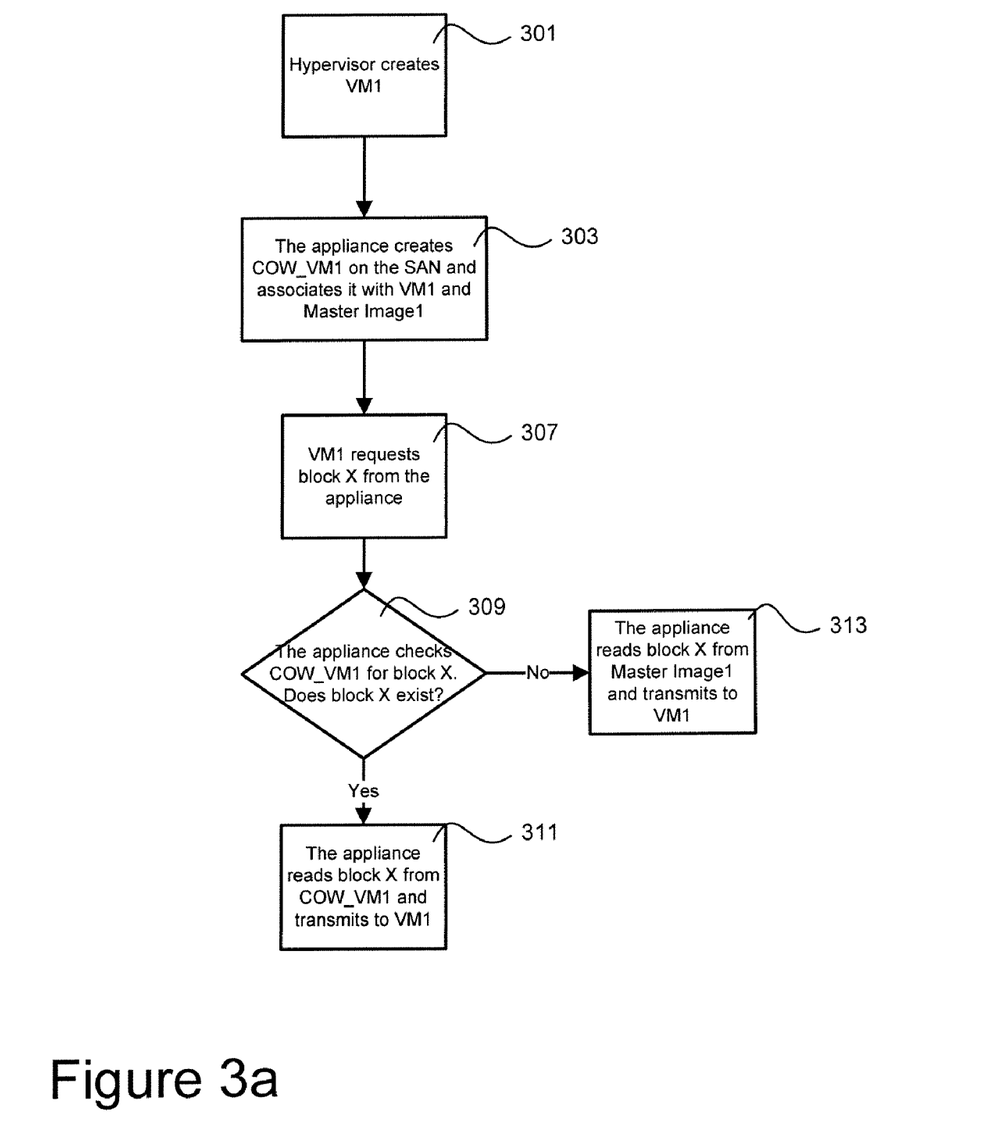
FIG. 3a shows a flow chart illustrating a read request from a virtual machine to an appliance in accordance with an embodiment of the present disclosure.

Turning now to FIG. 3a, a diagram showing instantiation of a virtual machine and subsequent access of blocks according to one embodiment of the disclosure is provided. The process may begin when a virtual machine is instantiated. An exemplary virtual machine "VM1" is portrayed. In block 301, VM1 may be created by a hypervisor and may request access to blocks from the appliance 117. The blocks may correspond to files for the operation of the virtual machine. The appliance 117 may access the storage area network 101 and create a COW volume associated with VM1, as shown in block 303. In this example, the associated COW volume is called "COW_VM1," but it should be recognized that any naming convention may be used to create a COW volume and associate it with a virtual machine. COW_VM1 may contain no blocks after it is created. New blocks written may be placed in COW_VM1.

In block 307, VM1 may request an exemplary block "block X" from the appliance 117. VM1 may transmit a request for block X by any way to recognize a unique block within a volume. VM1 may request one block, or may request multiple blocks at a time. The request may be transmitted to the appliance 117. The appliance 117 may receive the request and may search COW_VM1 for block X, as shown in block 309. The search for block X within COW_VM1 may occur in many different ways. For example, the appliance 117 may search every block contained within COW_VM1 for block X, or the appliance 117, the storage area network 101, and/or COW_VM1 may create and update a list of blocks that are contained within COW_VM1. If block X is found within COW_VM1, as shown in block 311, then the appliance 117 may transmit block X to VM1.

If block X is not found within COW_VM1, as shown in block 313, then the appliance 117 may search the associated master image 105 for block X. The search for block X within the master image 105 may occur in many different ways. For example, the appliance 117 may search every block contained within the master image 105 for the block, or the appliance 117, the storage area network 101, and/or the master image 105 may contain a list of blocks that are contained within the master image 105.

Figure 3B:
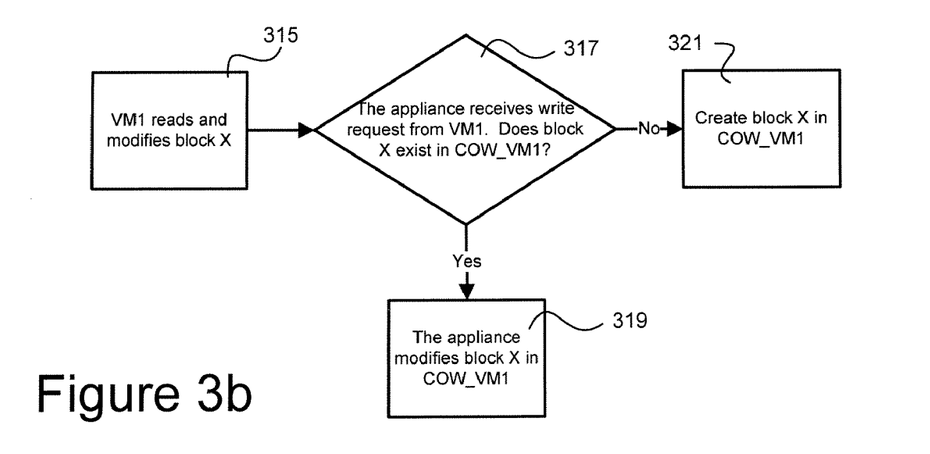
FIG. 3b shows a flow chart illustrating a write request from a virtual machine to an appliance in accordance with an embodiment of the present disclosure.

If the appliance 117 finds block X in either COW_VM1 or in the associated master image 105, the appliance 117 may transmit block X to VM1. Turning now to FIG. 3b, VM1 may modify block X, as shown in block 315, so that it is different than the block supplied by the appliance 117. VM1 may then transmit a write request to the appliance 117, as shown in block 317, so that the modified block X may be saved to persistent storage.

The appliance 117 may receive the write request from VM1 and then may search COW_VM1 for block X. If block X is found within COW_VM1, then the appliance 117 may modify the copy of block X found within COW_VM1 so that it matches the copy of block X modified by VM1, as shown in block 319. If the appliance 117 does not find block X within COW_VM1, then it may create block X within COW_VM1, as shown in block 321. The appliance 117 may then update the list of blocks located in the appliance 117, the storage area network 101, and/or COW_VM1 to indicate that block X may be located within COW_VM1. The appliance 117 may transmit a successful write notification to VM1, or if the write operation is unsuccessful, it may transmit an error message to VM1.

It should be noted that FIGS. 3a and 3b show many possible operations. More than one of the operations may be repeated or combined for operation of VM1. For example, VM1 may require more than one block from the appliance 117 in order to properly start up. Alternatively, VM1 may transmit more than one block request, and then more than one block modify request.

According to one embodiment of the disclosure, block operations as shown in FIGS. 3a and 3b may not alter blocks contained within the master image 105, may not add new blocks to the master image 105, and may not delete blocks from the master image 105.

It may be desirable to update the master image 105 with changes included in one or more of the COW volumes. For example, a patch to fix or update the files associated with a virtual machine may be applied to one or more of the virtual machines. A patch may not be able to be applied directly to a master image 105 if the patch is context-sensitive to individual virtual machine instances. A context-sensitive patch may need to be applied to each virtual machine separately. If the patch modifies one or more files so that they are substantially similar across the virtual machines, but different than files in the associated master image 105, or if the patch creates one or more files, then the same file or files may be duplicated in clusters across more than one COW volume. Alteration of the master image 105 may be desirable to avoid or reduce duplication of files or underlying clusters. The use of the term "cluster" is exemplary only; a cluster may be a file allocation unit, or any other unit of measure for persistent storage.

Figure 4:
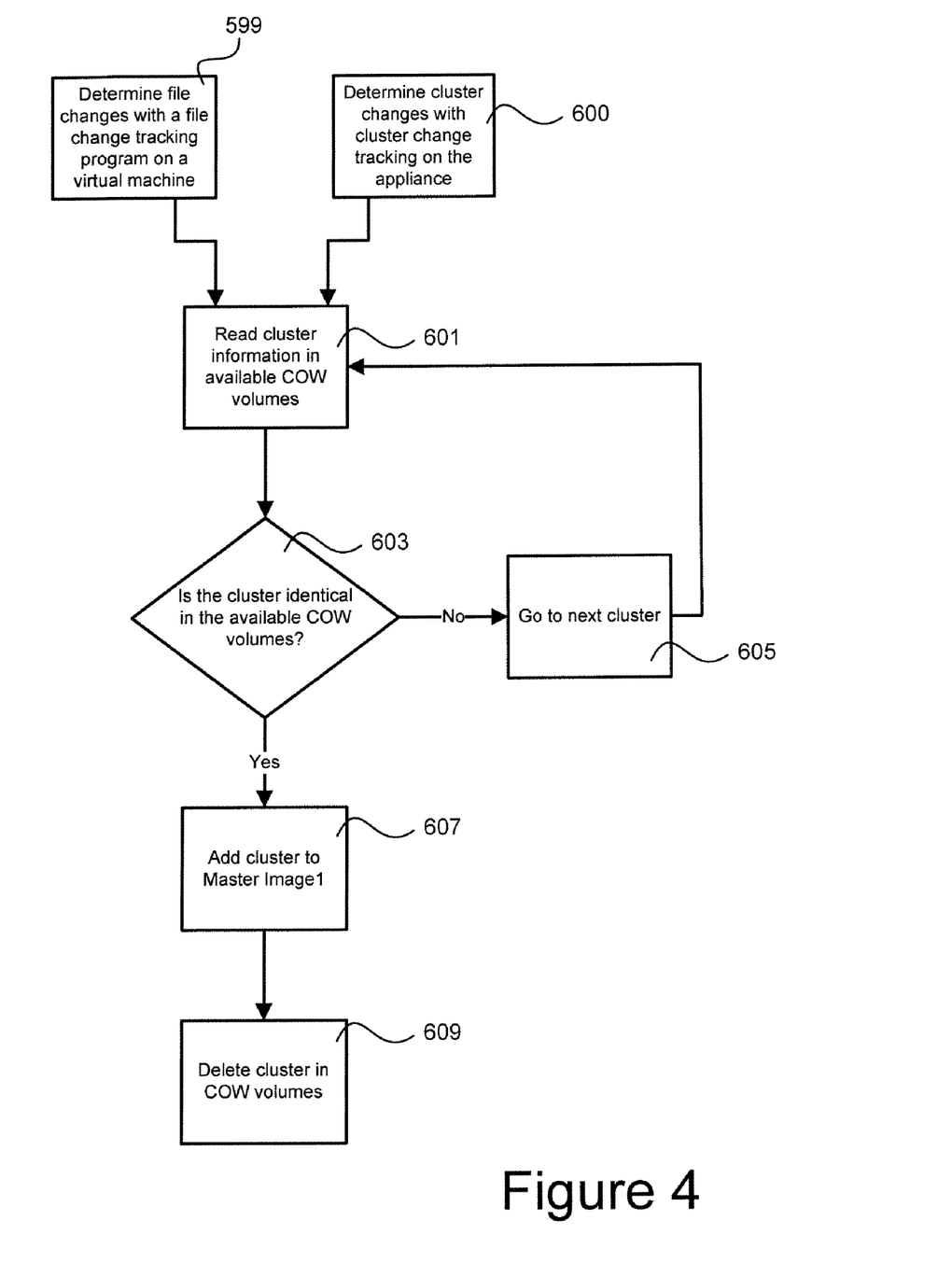
FIG. 4 shows a flow chart illustrating COW volume and master image optimization in accordance with an embodiment of the present disclosure.

Turning now to FIG. 4, a flow chart is shown according to an exemplary embodiment of the present disclosure. The appliance 117 or other system tasked with persistent storage optimization may receive cluster information in the available COW volumes associated with a master image, as shown in block 601. The cluster information may include a mathematical function based on the data within the cluster, for example a hash function, or may include the entire cluster's data for a bit-by-bit comparison.

A program may operate during a patching procedure on a virtual machine to track which files have been changed, added, or deleted by the patch. The appliance 117 may also operate a program to track cluster changes made by the virtual machines in the COW volumes.

The appliance 117 may then compare the clusters in the COW volumes to each other and to files in the master image 105. The appliance 117 may use the file change tracking information created by the program operating on the virtual machine during patching, or the appliance 117 may use the cluster change tracking information created by the programming operating on the appliance 117, or the appliance 117 may use both the file change tracking information and the cluster change tracking information in order to identify common cluster changes within the COW volumes. The comparison may include every cluster in every COW volume, or may include a subset of the clusters. As shown in block 603, the system may compare the clusters in the available COW volumes. If the selected clusters are not identical across the COW volumes, then the system may go to the next cluster in the COW volume, as shown in block 605. If a cluster exists and is identical across the COW volumes, and an older or different associated cluster is found in the master image 105, then the system may add the cluster found in the COW volumes to the master image 105 and delete the cluster from the COW volumes, as shown in blocks 607 and 609. The original cluster may remain in the master image 105. The original cluster will be inherited by newly created virtual machines.

Figure 5:
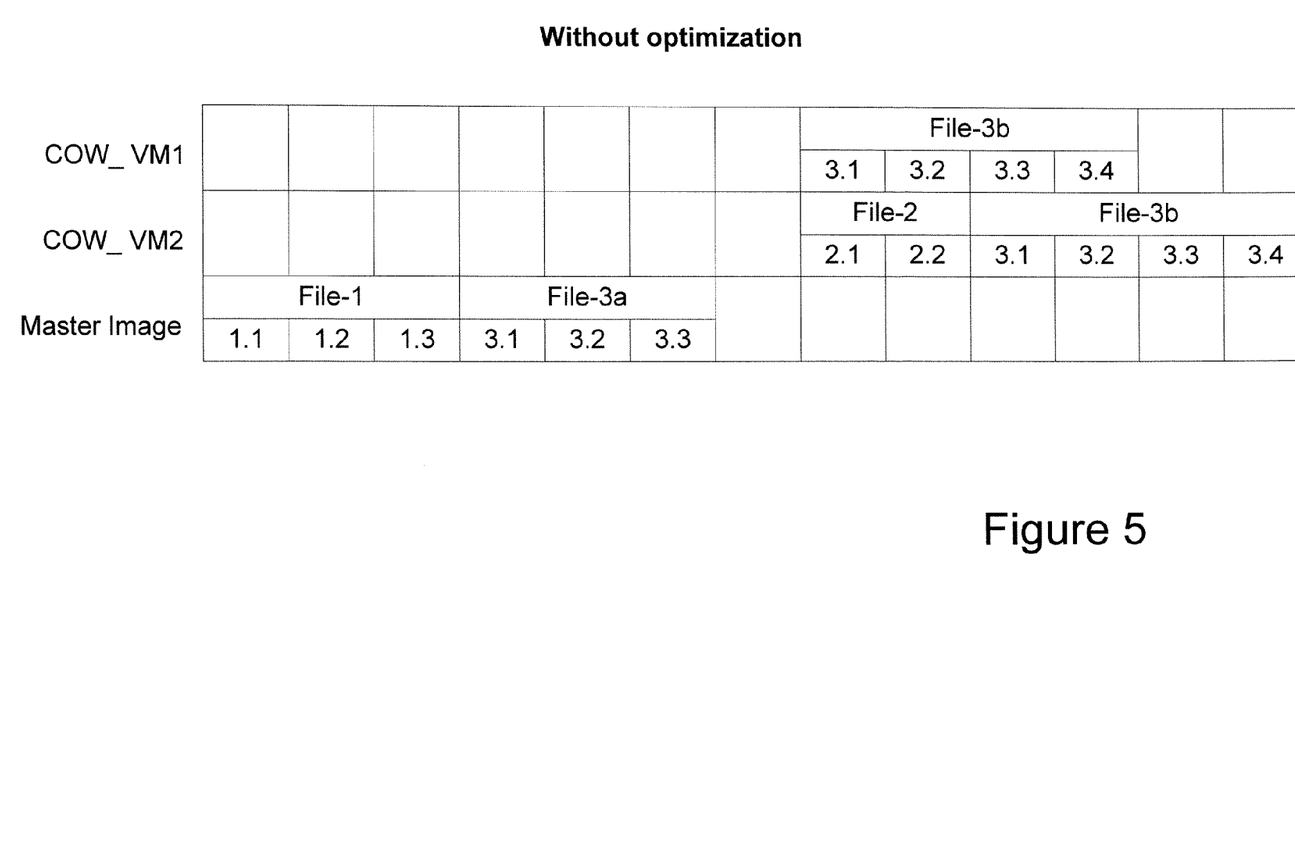
FIG. 5 shows an exemplary storage space diagram illustrating COW volumes and a master image before optimization in accordance with an embodiment of the present disclosure.

Turning now to FIG. 5, an exemplary disk space diagram showing exemplary COW volumes COW_VM1 and COW_VM2, and an associated master image 105, is provided according to an embodiment of the present disclosure. COW_VM1, COW_VM2, and the master image 105 are shown as rows of blocks. Each block may represent an exemplary unit of persistent storage, for example a cluster. The files and clusters included in FIGS. 5 through 8 are also exemplary and are used to show an optimization process according to one embodiment of the disclosure. The list of files included in COW_VM1, COW_VM2, and the associated master image should not be construed to be a complete representation of all files required for operation of a virtual machine.

COW_VM1 may contain File-3b using four clusters of persistent storage. COW_VM2 may contain File-2 using two clusters of persistent storage and File-3b using four clusters of persistent storage. File-3b within COW_VM1 and COW_VM2 in this example may be identical files made up of identical clusters. File-3b may have been created when a patch was applied to associated virtual machines VM1 and VM2, in which File-3a was replaced or updated with File-3b. File-3a may not be addressed by either VM1 or VM2 in this example, having been overwritten or deleted by the patch applied to VM1 and VM2. The associated master image may contain File-1, using three clusters of persistent storage, and File-3a, using three clusters of persistent storage. File-3a on the master image may not be identical to File-3b on COW_VM1 and COW_VM2.

Figure 6:
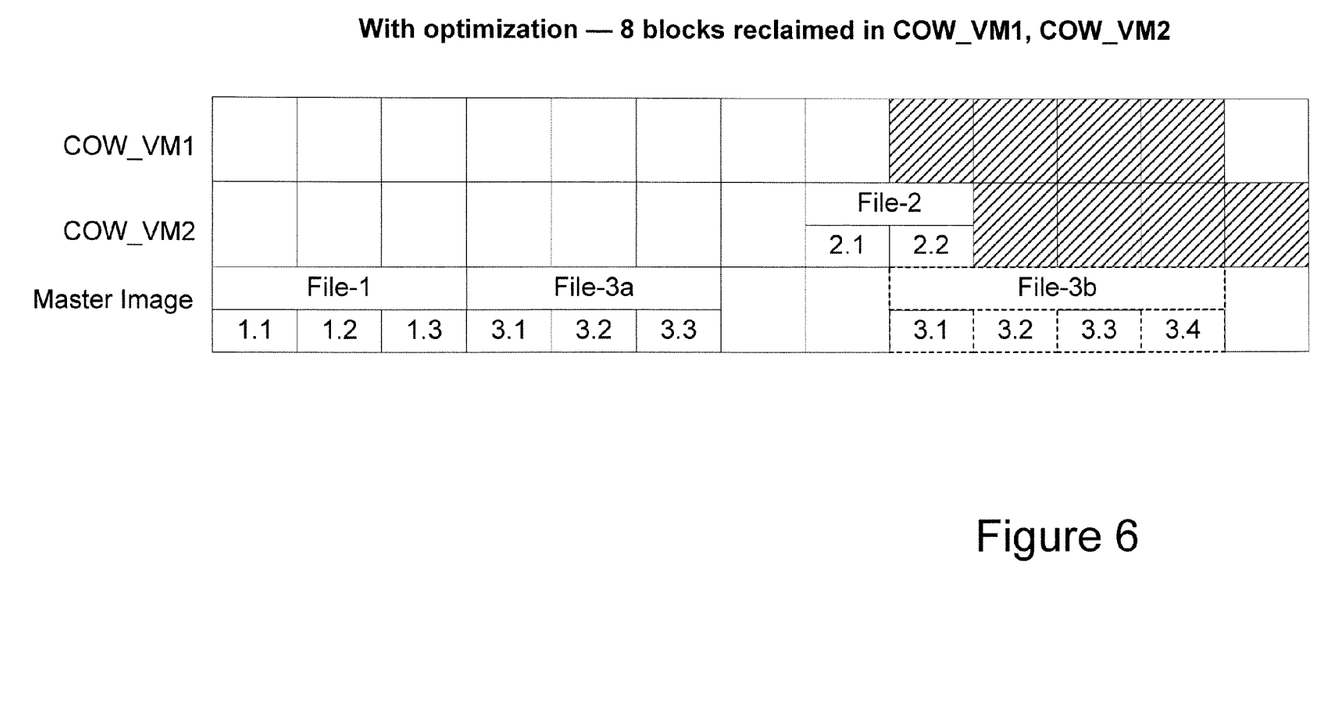
FIG. 6 shows an exemplary storage space diagram illustrating COW volumes and a master image after optimization in accordance with an embodiment of the present disclosure.

Turning now to FIG. 6, an exemplary disk space diagram showing exemplary COW volumes COW_VM1 and COW_VM2, and an associated master image 105 after optimization is provided according to an embodiment of the present disclosure. COW_VM1, after optimization, may contain no files, as the four clusters of persistent storage constituting File-3b were freed, shown as shaded clusters in the COW_VM1 row of persistent storage clusters. COW_VM2 contains File-2. The blocks containing File-3b in COW_VM2 were freed, shown as four shaded clusters of persistent storage in the COW_VM2 row of persistent storage clusters. The master image 105 may contain original File-1, constituting three clusters of persistent storage, original File-3a, constituting three clusters of persistent storage, and new File-3b, constituting four clusters of persistent storage. Eight shaded clusters are shown in COW_VM1 and COW_VM2, indicating newly free clusters of persistent storage. Over all of the persistent storage areas in COW_VM1, COW_VM2, and the master image 105, a total of four clusters of persistent storage may have been freed by the optimization procedure. File-3b may have been added to persistent storage associated with the master image 105, but may not be added to the master image logical view. That is, information regarding the clusters originally created in the master image may be retained and not modified by subsequent writes to the master image. If another clone of the master image 105 was created to associate with another virtual image, clusters related to File-1 and clusters related to File-3a may be addressable by the new virtual image, and clusters related to File-3b may not be addressable by the new virtual image.

At this point it should be noted that the technique for shared persistent storage optimization in accordance with the present disclosure as described above typically involves the processing of input data and the generation of output data to some extent. This input data processing and output data generation may be implemented in hardware or software. For example, specific electronic components may be employed in a computer processor or similar or related circuitry for implementing the functions associated with file creation, transfer, deletion, or network communication in accordance with the present disclosure as described above. Alternatively, one or more processors operating in accordance with stored instructions may implement the functions associated with file creation, transfer, deletion, or network communication in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for allocating storage for a plurality of virtual machines, comprising the steps of:
   providing the plurality of virtual machines;
   creating a master image containing one or more blocks that are commonly used by the plurality of virtual machines to initiate operation of the plurality of virtual machines, wherein the master image comprises at least a portion of a boot image and is stored on shared storage that is accessible to each of the plurality of virtual machines;
   creating a plurality of storage volumes, each of the plurality of storage volumes being associated with at least one of the plurality of virtual machines and the master image;
   identifying a plurality of updated blocks that are similar in the plurality of storage volumes;
   copying the plurality of updated blocks to the master image; and
   freeing memory space associated with the plurality of updated blocks in the plurality of storage volumes.

2. A method according to claim 1, wherein the plurality of storage volumes are stored on shared storage.

3. A method according to claim 1, further comprising a network in communication with the plurality of virtual machines and a network file system in communication with the network.

4. A method according to claim 3, further comprising an appliance in communication with the network, the appliance containing the master image and the plurality of storage volumes.

5. A method according to claim 1, wherein the plurality of updated blocks are a plurality of new blocks.

6. A method according to claim 1, wherein the plurality of updated blocks are a plurality of changed blocks from one or more of the commonly used blocks on the master image.

7. At least one processor readable storage medium for storing a computer program of instructions configured to be readable by at least one processor for instructing the at least one processor to execute a computer process for performing the method as recited in claim 1.

8. A method according to claim 1, further comprising determining whether the plurality of updated blocks associated with the plurality of virtual machines are identical.

9. A method for reducing storage required for a plurality of virtual machines, comprising the steps of:
   providing the plurality of virtual machines;
   providing a master image containing one or more clusters that are commonly used by the plurality of virtual machines to initiate operation of the plurality of virtual machines, wherein the master image comprises at least a portion of a boot image and is stored on shared storage that is accessible to each of the plurality of virtual machines;
   providing a plurality of storage volumes, each of the plurality of storage volumes being associated with at least one of the plurality of virtual machines and the master image;
   identifying a plurality of clusters that are similar contained within the plurality of storage volumes;
   copying the plurality of identified clusters from the plurality of storage volumes to the master image so as to reduce storage; and freeing the plurality of identified clusters from the plurality of storage volumes.

10. A system for allocating storage for a plurality of virtual machines, comprising:
  a server configured to:
    provide the plurality of virtual machines; and
  an appliance configured to:
    create a master image containing one or more blocks that are commonly used by the plurality of virtual machines to initiate operation of the plurality of virtual machines, wherein the master image comprises at least a portion of a boot image and is stored on shared storage that is accessible to each of the plurality of virtual machines;
    create a plurality of storage volumes, each of the plurality of storage volumes being associated with at least one of the plurality of virtual machines and the master image;
    identify a plurality of updated blocks that are similar in the plurality of storage volumes;
    copy the plurality of updated blocks to the master image; and
    free memory space associated with the plurality of updated blocks in the plurality of storage volumes.

11. A system according to claim 10, wherein the master image is stored on a storage area network.

12. A system according to claim 10, wherein the plurality of storage volumes are stored on a storage area network.

13. A system according to claim 10, further comprising a network in communication with the plurality of virtual machines and the appliance in communication with the network.

14. A system according to claim 13, further comprising a storage area network in communication with the network, the storage area network containing the master image and the plurality of storage volumes.

15. A system according to claim 10, wherein the plurality of updated blocks are a plurality of new blocks.

16. A system according to claim 10, wherein the plurality of updated blocks are a plurality of changed blocks from the commonly used blocks on the master image.

* * * * *